US011362929B2

(12) United States Patent
Ordway et al.

(10) Patent No.: US 11,362,929 B2
(45) Date of Patent: Jun. 14, 2022

(54) SYSTEM AND METHOD FOR REMOTE MANAGEMENT OF SALE TRANSACTION DATA

(71) Applicant: LIGHTSPEED COMMERCE USA INC., New York, NY (US)

(72) Inventors: Jason Ordway, New York, NY (US); Joshua Vickery, New York, NY (US); Kieran Breen, Belfast (IE); Jordan Hamill, Belfast (IE)

(73) Assignee: Lightspeed Commerce USA, Inc., New York, NY (US)

( * ) Notice: Subject to any disclaimer, the term of this patent is extended or adjusted under 35 U.S.C. 154(b) by 0 days.

(21) Appl. No.: 16/914,573

(22) Filed: Jun. 29, 2020

(65) Prior Publication Data

US 2020/0328963 A1 Oct. 15, 2020

Related U.S. Application Data

(63) Continuation of application No. 14/918,446, filed on Oct. 20, 2015, now Pat. No. 10,735,304, which is a continuation-in-part of application No. 13/037,048, filed on Feb. 28, 2011, now Pat. No. 9,317,844.

(60) Provisional application No. 62/066,639, filed on Oct. 21, 2014, provisional application No. 61/309,678, filed on Mar. 2, 2010.

(51) Int. Cl.
*H04L 45/02* (2022.01)
*H04L 12/18* (2006.01)
*H04L 67/1095* (2022.01)
*H04L 67/1097* (2022.01)
*G06Q 20/20* (2012.01)

(52) U.S. Cl.
CPC ............ *H04L 45/02* (2013.01); *G06Q 20/20* (2013.01); *G06Q 20/206* (2013.01); *H04L 12/18* (2013.01); *H04L 67/1095* (2013.01); *H04L 67/1097* (2013.01)

(58) Field of Classification Search
CPC . H04L 45/02; H04L 67/1097; H04L 67/1095; H04L 12/18; G06Q 20/20; G06Q 20/206
See application file for complete search history.

(56) References Cited

U.S. PATENT DOCUMENTS 9,270,585 B2 * 2/2016 Manion ................... H04L 45/02
2008/0267116 A1 * 10/2008 Kang ..................... H04L 45/245
370/328

* cited by examiner

*Primary Examiner* — A. Hunter Wilder
*Assistant Examiner* — Joseph M Mutschler
(74) *Attorney, Agent, or Firm* — Ted Sabety; Sabety +associates, PLLC (57) ABSTRACT

This invention discloses a novel system and method and system for sharing a data item among a plurality of computers connected in an arbitrary network topology. In the preferred embodiment, each of the plurality of computers has a local copy of the data item, but can only edit the copy by obtaining a token from the current token owner, thereby becoming a new current token owner. When the token owner makes a change to the data item, the change is broadcast to the other computers, along with the identity of the new current token owner. Routing of token requests and broadcasts is accomplished by means of each computer calculating a routing table based on information it receives from those computers to which it is directly connected on the network.

11 Claims, 4 Drawing Sheets

SYSTEM AND METHOD FOR REMOTE MANAGEMENT OF SALE TRANSACTION DATA

This application claims priority as a continuation of U.S. patent application Ser. No. 14/918,446 filed on Oct. 20, 2015 which claims priority as a non-provisional continuation to U.S. Provisional Patent Application No. 62/066,639 filed on Oct. 21, 2014 and which is also a continuation-in-part of U.S. patent application Ser. No. 13/037,048 filed on Feb. 28, 2011, now issued as U.S. Pat. No. 9,317,844, issued on Apr. 19, 2016 which claims the benefit of U.S. Prov. Pat. App. No. 61/309,678, filed on Mar. 2, 2010, all of which are hereby incorporated by reference in their entireties for all that they teach therein.

This application incorporates by reference in their entireties U.S. Pat. No. 9,965,755 issued on May 8, 2018, U.S. Provisional Patent Application No. 61/948,126 filed on Mar. 5, 2014, U.S. Provisional patent application Ser. No. 14/676,146 filed on Apr. 1, 2015 and U.S. Provisional patent application Ser. No. 14/747,828 filed on Jun. 23, 2015.

FIELD OF INVENTION

This invention is related to point of sale systems typically used in retail stores. The invention is related to a novel architecture that permits a retail store owner to obtain sale transaction data management as a service instead of purchasing such a system and maintaining it. In one embodiment, the invention involves a plurality of register instances each operating on individual computer devices, where for a given retail store owner (or other kind of retail service) that are connected by one or more wireless computer network connections associated with the retail service utilizing the invention.

BACKGROUND

In typical point of sale systems for retail stores, a set of special purpose computers are positioned at the retail checkout locations. These are locally networked with a server located at the site of the retail store. For many retail stores, this requires a level of system maintenance responsibility that is beyond the staff capabilities of the retailer or too costly. In this invention, the point of sale system is designed so that it is provided as a service shared among participating retail vendors. With this kind of an architecture, the invention provides the service security, data integrity, robustness and redundancy.

DETAILED DESCRIPTION OF THE PREFERRED EMBODIMENTS

The typical embodiment of the system is centered around one or more servers that are hosted externally from the point of sale locations of the one or more vendors that use the system. Typically the servers are connected to the Register instances over a Wide Area Network, typically the Internet. A server is a computer containing or operatively connected, through a data network, one or more mass storage devices. The servers operate together as the repository of vendor information associated with the point of sale terminals. In the preferred embodiment, the terminals are typical personal computers operating an instance of the Register software. In other embodiments, the terminals are portable tablet devices running the Register software, where the tablet device has a wireless network connection that ultimately connects the Register software instance in a bi-directional data network connection to the servers. The servers are operatively connected to the point of sale terminals over a data network, a wide area network. In one embodiment, the Internet is the wide area network. The servers are accessed in several ways. The primary access is by means of the point of sale terminals. However, the servers are accessible from the Internet by other computers as well. The point of sale terminals is typically a personal computer running a typical operating system, for example, Windows™. In the preferred embodiment, a point of sale terminal is created by means of operating the Register software on a personal computer running Windows™. In other embodiments, the register instances are an application running on one or more iPads™ or other similar tablet device.

Register Software Instance: Each computer at a point of sale location that acts as the transaction input interface or terminal is a typical personal computer running an instance of the point of sale software, or Register software. The Register software is designed to execute particular protocols that cause communication between the Register software instance and the servers. The protocol is designed to ensure that the Register software has access to that part of the database hosted by the servers associated with the vendor whose Register terminal is making the access. In this architecture, each Register instance communicates across the wide area network, including the Internet to the servers housing the database information associated with the vendor. In addition, the Register software is designed so that where a vendor has more than one terminal operating the Register software, the specific instance of Register that is accessing the server is identifiable by the database.

Once the Register software has been securely installed on a machine, the vendor personnel can use it to connect to their specific database operating on the server. An authorized vendor personnel is prompted to input the vendor identity, a user name and password to log in as the operator for the cash register station. Once the Register instance has been initialized, the retail store personnel can use it to tally sales. The Register software presents a browser type interface with a user-customizable series of interactive screens that present the workflow typically used by that vendor.

At that point a transaction ticket is created, meaning a data object representing the transaction. That ticket contains a Register identifier, personnel identifier, item number, price and any other information the vendor has decided to associate with the transaction. Normally, the transaction ticket is transmitted to the server in conformance with the interactive protocol with the server. However, there are some embodiments where a transaction is pending and remains on the device and is not transmitted up to the server until the end of a shift or for periodic back purposes. For example, at a restaurant, the waiter, who is a user of the invention, may input an order for one or more items into the Register instance that is associated with one customer or customer group. This pending set of orders may be considered an "order", and be embodied in a data record stored in the device running the register instance. This order may remain local and pending. However, in this context, it may be that more than one person working for the retail service needs access to that order. Therefore, the system is adapted to share the stored order data record across all of the active register instances associated with the retail service without a transmission of the data record to the remote server.

In one embodiment, as soon as a user of one register instance creates a new order or transaction ticket, the register instance application automatically shares it among all of the other devices that are related to the same register instance. This makes it possible for more than one service personnel at a retail service provider service the same customer or customer group. In this embodiment, when the new order data structure is created, the register instance broadcasts that data structure to all of the related devices. In this context the register instances that are active and operating at a retail venue may be connected in a variety of ways. Some may be sharing the same Wi-fi™ network, for example, while others may be connected to one register instance by means of a Bluetoothm connection. See FIG. 3.

The register instance that is performing the broadcast, first creates another data container that acts as a data item that contains the new ticket or order data structure as a data payload. In one variation, the data container is comprised of the name or logical address of the destination device. In another variation, the data container contains a value that represents "broadcast", meaning that all of the related register instances are to receive the data payload. In the first variation, the register instance that is broadcasting transmits out N−1 data containers, where N is the number of active related register instances associated with the retail venue. In the second variation, the register instance transmits only I data items, where I is the number of register instances directly linked to the transmitting register instances. The remaining remote register instances are therefore some J where I+J=N.

In the preferred embodiment, the broadcasting register instance relies on a routing table that represents the manner for the register instance to reach each of the other register instance devices. The typical routing table is comprised of rows representing each device, and columns representing where the broadcasting register instance should transmit the data container in order for it to propagate to the designated destination. Each peer in the network computes its own routing table. By peer, it is understood to mean a device that can receive the data payload and transmit the data payload on to the next recipient in accordance with the routing table.

The first step to create the routing table is determining which destination devices are related. In one embodiment, the register instances discovery all directly reachable registers using a zero configuration network configuration protocol, also referred to as "zeroconf." A zeroconf protocol is able to operate correctly in the absence of pre-configured information received from either a user or infrastructure services such as conventional DHCP or DNS servers. Zeroconf protocols may use configured information, when it is available, but do not rely on it being present. For example, the use of MAC addresses (i.e. layer two addresses) as parameters in zeroconf protocols is generally acceptable because they are globally unique and readily available on most devices of interest. The benefits of zeroconf protocols over existing configured protocols are an increase in the ease-of-use for end-users and a simplification of the infrastructure necessary to operate protocols. In the preferred embodiment, the invention relies on the Bonjour™ protocol. In another embodiment, each time a register instance is activated and recognized by the server system, the server system transmits to all the other active register instances associated with the same account, the identity of the newly activated device. For devices that are connected through another device, for example, a first device may be connected by wifi through to the internet and the server, while a second device may be connected by Bluetooth to the first device. Upon such activation, the network topology may have changed, so in response to receiving a command that a new device has joined the network, all of the peers recalculate their routing table.

Figure 1:
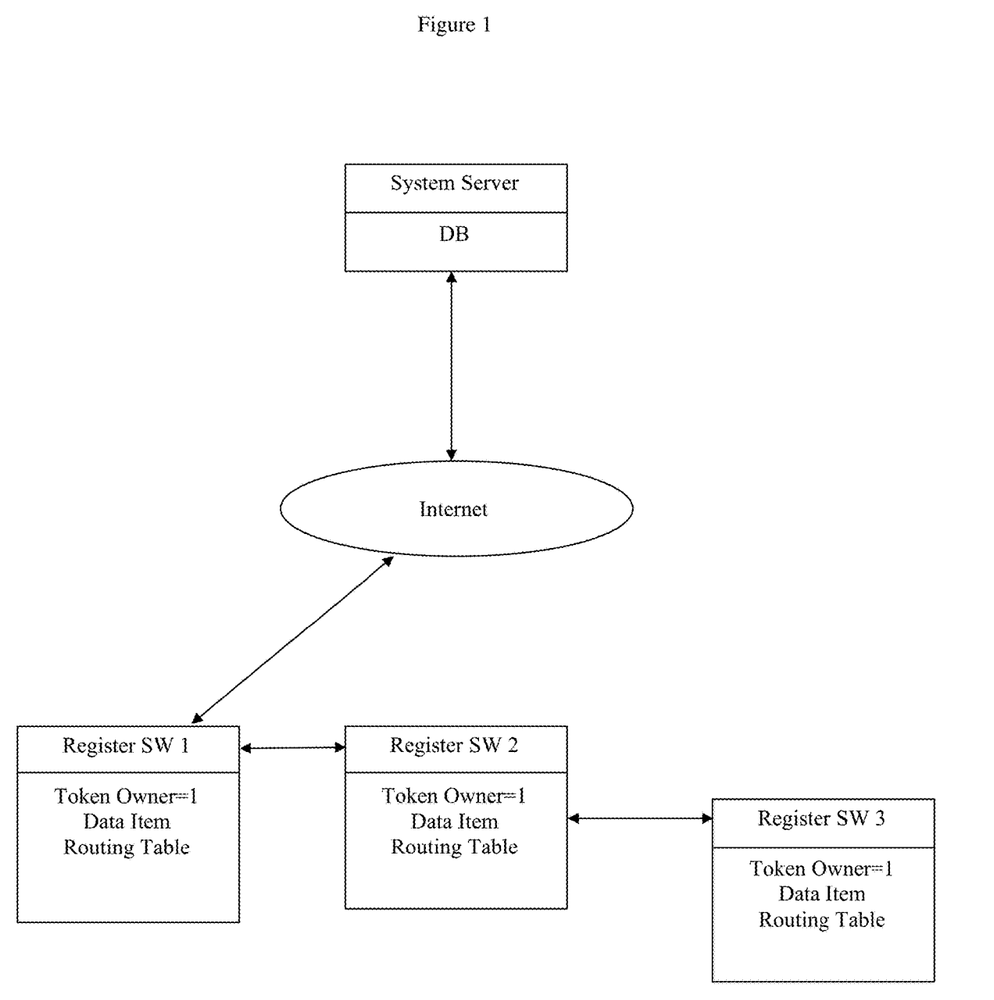
FIG. 1. Schematic of example system architecture.
Figure 2:
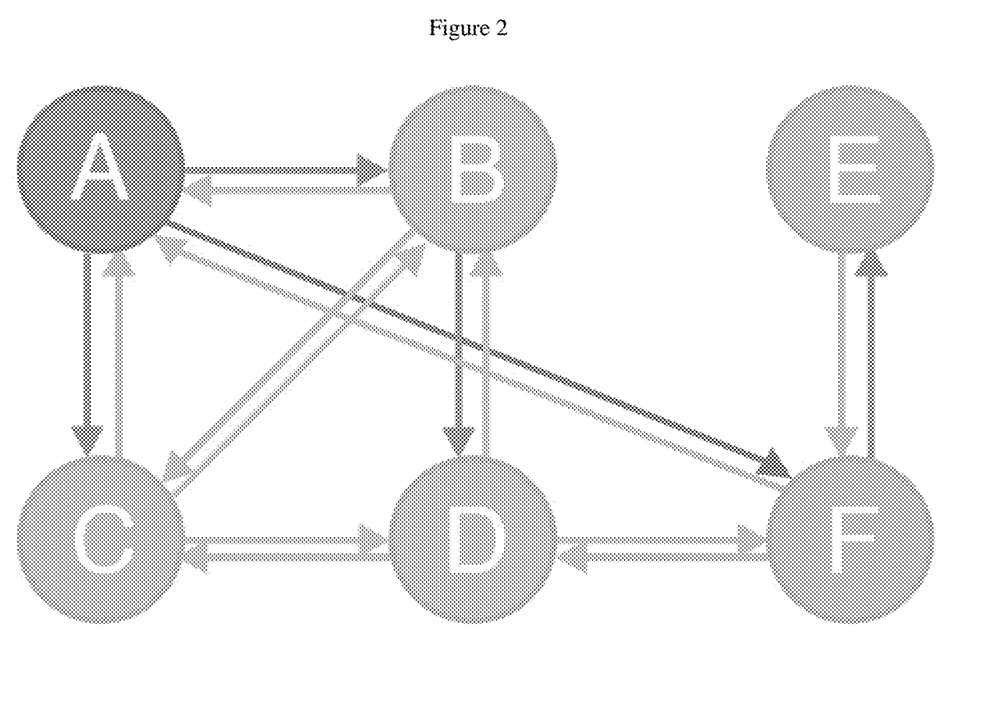
FIG. 2. Example network topology architecture.

Register instances that operate on a first device that acts as the go-between peer for the second device receive messages from the server that are comprised of data representing that they are broadcast messages Since each register instance holds a complete routing table, messages may be routed from one register to any other register without involvement of a server. When a message is received by a register instance other than the one to which it is addressed, that register consults its routing table to determine the next stop on the path until the message ultimately reaches the register to which it is addressed. As depicted in FIG. 2, messages from A to E pass through F, while A communicates directly with B, C, D and F. The system and method manages the data regardless of what the network topology is.

At the initiation of each register instance or when a register instance is logged off, a series of instructions executes to create a routing table on each register instance. All the devices operating as register instances then calculate a routing table for that device relative to the other devices. The register instances exchange a data structure representing a list of all of the available devices. This data structure may also contain entries that indicate whether one device is connected through another device. The routing table data structure is typically arranged as a representation of a series of rows, each row corresponding to one of the active register instances. In the column is the identity of the device where the data container must be sent in order to arrive at the device listed in the first column. As an example, the network of devices in FIG. 2 shows that for the data container to reach device F, it has to be transmitted to E, with F as the destination listed in the data container. Therefore, for row E, the second column entry is F. Other forms of routing table may be used, including a table where the second entry is the series of devices through which the message must pass to reach its destination. In the preferred embodiment, the register instances will execute a shortest-path calculation in order to populate the routing table. In one embodiment, Djikstra's algorithm may be used. In an alternative embodiment, each peer broadcasts to its connected peer a list of all of its connections. Any peer receiving a broadcast retransmits it to its other peers. In order to avoid traffic overload, the peer checks for data redundancies in the broadcast message and truncates the redundancies until all peers have the broadcast information and the process stops. In the preferred embodiment, each peer transmits its routing table for its local connection list to its connected peers. Each receiving peer then re-calculates its routing table in reliance on the incoming routing table. If the recalculated routing table has changes from its prior version, the peer broadcasts that revised routing table out to its peer list. By means of this technique, a network is created. In one embodiment, the register instance in the background continuously runs Bonjour™ to look for more register instances that it can connect to, and then if it finds one, it reruns the routing table calculation where the additional peer connection is included. If the routing table changes, then it is broadcast to its peer connections.

The system is able to operate a distributed process of updating customer orders. Because the initial order when opened is broadcast to all register instances, each register instance may be used to update the order. Each update, no matter which device is the originator, may update its local version of the order data structure and at the same time, broadcast that ticket to the other register instances. When a register instance receives a broadcast update to an order it has in local storage, it automatically updates that order. In addition, any one of the register instances may run a payment on the order, and then broadcast the result to all of the other register instances. In this manner, the collection of register instances operating on a collection of computers operates a fully distributed order processing system.

Figure 4:
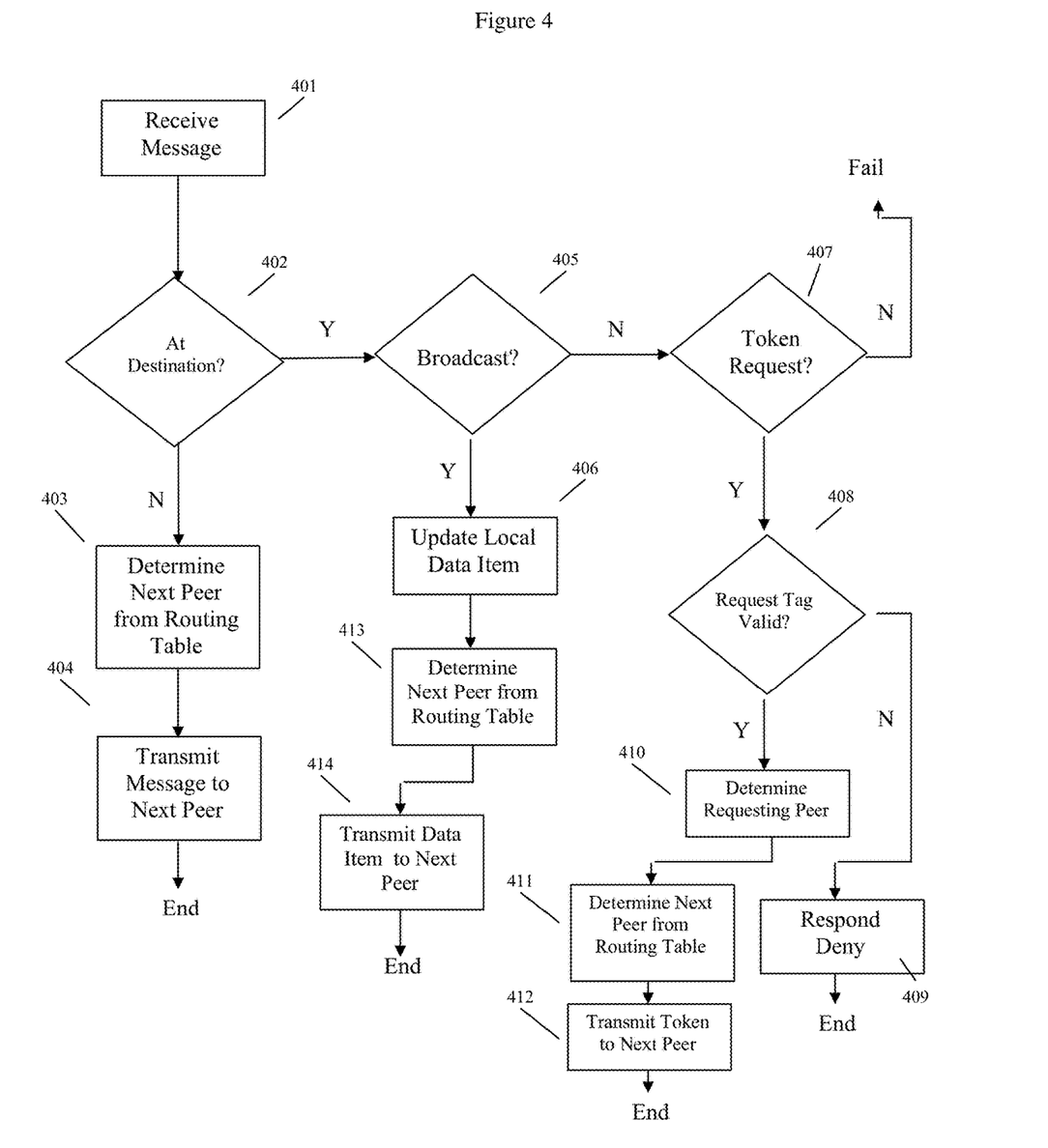
FIG. 4. Flowchart for Conflict Avoidance.

The broadcast of synchronizing updates to orders requires that conflicts be avoided due to timing or other aspects. In one embodiment each register instance follows a protocol that locks all of the orders unless a permission token is obtained. In one embodiment, the token is passed around from device to device, so that at any one time, only one device has the ability to update the order. However, the power to update the order includes the power to broadcast the update. Therefore, updates that are received by broadcast are updated locally without a token, while updates that are a result of input into the register instance, for example, an additional purchase, are only updated if the register instance has the ownership token. A register instance receives a data message (401) and determines whether the message is intended for that instance (402). If it is not the destination, then the register instance determines the next peer from its routing table (403) and passes the message on (404). The identity of the register instance with the ownership token is the register instance that last broadcast an update to the order (or, in the initial instance, the creation of the order.) That identity can be a data value present in the data payload comprising the broadcast update. When a register instance receives an update, it can write the update into the locally stored data structure representing the order, including the current identity of the ownership identity. If the register instance determines that the message is for that instance, it checks whether the message is a broadcast (405). If so, then the local data item is updated with the data in the message (406). In addition, the routing table is used to then pass the broadcast message on (413), (414). In this manner, a register instance that requires the ownership token for a particular order can then retrieve the identity of the current owner from local memory and then transmit a token request to that current owner of the order that has the token. The request contains the destination address of the token owner, and the requesting peer uses the routing table to determine where to transmit its request (403), (404). Any peer that receives a token request or broadcast, re-transmits the request out to the correct peer on the path to the destination based on its local routing table. The re-transmitting peer is able to determine whether it is the destination or re-transmitting peer by inspecting the incoming request message and determining whether the destination in the message is its identifier. When that transmitting or requesting register instance receives the token and confirms its receipt, it becomes the new owner. When the new addition to the order is written into the local copy of the order, a broadcast message is also created by the requesting register instance that includes the update and the identity of the new current owner.

In one embodiment, the system is configured to prevent the situation where a peer requesting the token has failed to receive the latest broadcast. In one embodiment, the current token owner A broadcasts its changes to all of the other peers. The other peers respond with a confirmation of receipt. The identities of the confirming peers is stored in A's memory. When requesting peer B, sends a request for the token to A, A checks that B appears in the broadcast confirmation list. In another embodiment, the broadcast transmitted by A can have a unique tag, for example (and without limiting what the tag might be) a random number, a checksum or a timestamp. When a peer receives the broadcast, it stores the tag. When B requests a token from A, it also includes in the request the tag value. When A receives the token request (407), it checks the tag value (408) to see if it matches the latest broadcast A transmitted. If not, the request is denied (409). If it does, then it uses the routing table (410) to transmit the token (411) to the requesting peer, with the assurance that B will be modifying the latest version of the data item or check.

Updating Order with Token.
1. Register B sends request for Token to Register A
  at this point Register A holds Token and A can continue to update the check.
2. Register A sends Token to Register B
  at this point Register A holds Token, but no longer allows updating by A
  at this point Register B holds Token and allows updating by B
3. Register B acknowledges receipt of Token
  at this point Register A relinquishes Token
  Register B broadcasts update to A and other devices.
Failure Handling
1. Failure in 1
  Register A holds Token
  Register B may retry 1
2. Failure in 2
  Register A retries 2 until timeout and then reclaims ownership of Token
  Register B can retry 1
3. Failure in 3
  Register A retries 2 until timeout and then marks check as stuck on Register 2B
Failure in 3 may require user intervention
In the case where Register B went permanently offline then Register A will force its reclaim of the check.
This is the same as what happens if a Register goes offline while owning a check.
Otherwise, when Register A wants the check again, it can request Token from Register B.
Broadcast Updates:
1. Upon receiving a broadcast update:
  Update local copy of order with update.
  Revise indicated token owner with identity of register that transmitted broadcast.

In the preferred embodiment, all peers are connected using whatever radio interface is available, whether a Wi-fi™ interface or Bluetooth™. The peers discover each other directly or by using shared network knowledge, or discovery by proxy. Each peer then informs every other peer about who its neighbors are. Where one peer is connected to another via Bluetooth, it can discover WiFi connected peers by using a middle man peer that is connected to both the Wifi network and to a peer using Bluetooth. In this manner, there is no need for a fully connected graph: peers can be connected through other routing or middle man peers using message forwarding. All peers are still connected together, but some of these could be considered virtual connections in nature.

Figure 3:
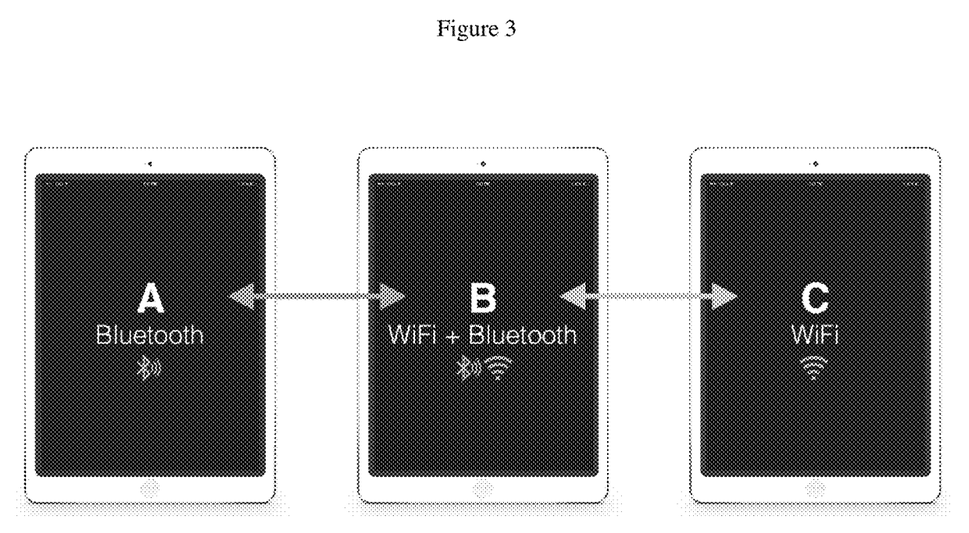
FIG. 3. Example of Peer connections.

As shown in FIG. 3, there are three connected peers. A connects to B using Bluetooth. B connects to C using WiFi. The behavior is like a fully connected graph because B forwards messages it receives from A on to C. Peer to peer spurious connection not possible because when a register instance is activated, it gets an account identifier that is included in its peer to peer requests. Thus, if a peer device overextends into another account's network of peers its requests in that other account network will be denied. This may be accomplished in several ways. First, the wireless network may be password protected to be unique to and only usable by one set of related register instances. Second, when the routing table information is requested or transmitted, the protocol can contain a step of authentication, where the device that is to receive the must first submit an authorization token to the transmitting peer. That token may be derived from activation of the Register instance so that it is uniquely associated with the account controlling the set of related Register instances and shared among them. Third, upon initiation of each Register instance, which requires authentication with the server, an authorization token unique for that initiated instance may be broadcast from the server to each other Register instance. Fourth, the routing table and data payload may be encrypted using a key unique to the account that controls the shared register instances. The system assumes all peers have had an independent connection to the internet at least sufficient to activate the register instance. However, once activated, the peers will communicate among themselves without reliance on the Internet or a central server system.

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system comprised of a server and at least one computers, each of said at least one computers being connected using at least one remote wireless data network, and one of the at least one computers being connected by a data network to the server, comprising:
    an authorized additional computer comprising the at least one computers, said authorized additional computer being the most recent computer comprising the at least one computers to be authorized to access the at least one wireless data network;
    the at least one computers each comprised of memory comprised of program data that when executed causes the corresponding at least one computer to:
    receive at each of the of the at least one computers a data message comprised of an identifier corresponding to the authorized additional computer;
    in response to the receiving step, at each one of the at least one computers, calculate a corresponding at least one routing table data structure that encodes a next peer destination for a data communication path utilizing the wireless network from the corresponding one of the at least one computers to each of the other computers in the plurality of computers, including the authorized additional computer said data communication path not passing through the server;
    store in the local memory of the at least one computers its corresponding calculated routing tables;
    receive at a first of the at least one computers from a second of the at least one computers, a data message comprised of data designating a third of the at least one computers as destination of the message and
    routing the received data message to the third of the computers using the at least one remote wireless communication network and without the data message passing through the server by:
    in at least one of the computers, determining using the locally stored routing table, the next peer on a path to the third computer; and
    transmitting the data message to the determined next peer.

2. The system of claim 1 where the data comprising the memory of the at least one computer further causes the computer to:
    receive at a first of the at least one computers a message comprised of a value that represents "broadcast"; and
    determine using the locally stored routing table at least one computer listed as a next peer connection;
    transmit the message from the first computer to the determined next peer connection, where the transmitted message is comprised of the value representing "broadcast".

3. The system of claim 1 where the data comprising the memory of the at least one computer further causes the at least one computer to:
    operate as a register instance;
    receive input command data representing an additional purchase into a first of the at least one computers and in response, update on the first of the at least one computers a data structure representing an order stored on the first computer to include data representing the additional purchase;
    in response to the updating of the order, generate a data payload comprised of the updated order data, said data payload further comprised of a value representing "broadcast"; and
    transmit the data payload from the first computer to all other of the at least one computers that are listed as a next peer connection in the routing table stored on the first computer;
    at a second of the at least one computers, receive a broadcast comprised of an updated order data payload;
    determining one of the at least one computers as the computer that owns the received order by inspecting the received order data payload;
    generate a data payload comprising a request for ownership and a destination corresponding to the determined owning computer.

4. The system of claim 3 where the data comprising the memory of the at least one computer further causes the at least one computer to:
- receive at the first computer a message representing a request for ownership of the order;
- determine a computer in the system corresponding to the change of ownership request by inspecting the data comprising the received message;
- calculate a destination computer from the routing table for routing an order ownership change data message to the determined computer; and
- transmit the order ownership change data message to the destination computer.

5. The system of claim 4 where the data comprising the memory of the at least one computer further causes the at least one computer to:
- receive at the first computer a change of order ownership data message;
- generate a data payload comprised of the updated order, an identification of a computer designated as the owner of the order and a value indicating "broadcast"; and
- transmit the generated data payload to a next peer indicated in the routing table of the first computer.

6. The system of claim 4 where the data comprising the memory of the at least one computer further causes the at least one computer to:
- broadcast from the first computer the order to all of the other peer computers in the wireless computer network;
- receive a confirmation of receipt from at least one of the other computers;
- store in memory the identity of the confirming computers; and
- determine whether an identity of the computer requesting the change in ownership is listed among a set of predetermined stored identities, and if not, transmitting a response denying the request.

7. The system of claim 4 where the data comprising the memory of the at least one computer further causes the at least one computer to:
- broadcast from the first computer to the other computers comprising the at least one computers the order data payload with a unique broadcast tag value corresponding to the content of the data payload;
- store on the receiving computers the order data and unique broadcast tag value;
- receive from the requesting computer a tag included with the ownership change request; and confirm that the received tag matches the broadcast tag value.

8. The system of claim 2 where the data comprising the memory of the at least one computer further causes the at least one computer to:
- receive at the at least one of the of computers a broadcast peer list;
- update at each computer, its corresponding stored routing table using the received broadcast peer list;
- calculate at said at least one of the computers a peer list derived from the updated routing table stored on the said at least one of the plurality of computers; and
- use the at least one of the plurality of computers to transmit to an at least one of its connected peers a data payload comprised of the received peer list.

9. The system of claim 8 where the data comprising the memory of the at least one computer further causes the at least one computer to:
- detect any redundancies in the updated peer list at the at least one of the plurality of computers; and
- truncate the redundancies from the data payload.

10. The system of claim 1 where the data comprising the memory of the at least one computer further causes the at least one computer to:
- receive connectivity information describing connectivity among at least a subset of the at least one computers; and
- use the received connectivity information to calculate the peer list at the at least one of the computers.

11. The system of claim 1 where the data comprising the memory of the server that when executed further causes the server to authorize an additional computer to operate as one of the at least one of computers connected using the at least one remote wireless network.

* * * * *